UNITED STATES PATENT OFFICE.

KARL RÜCKER, OF ZERNSDORF, GERMANY.

METHOD OF FIREPROOFING WOOD.

SPECIFICATION forming part of Letters Patent No. 691,812, dated January 28, 1902.

Application filed June 25, 1900. Serial No. 21,468. (No specimens.)

*To all whom it may concern:*

Be it known that I, KARL RÜCKER, Ph. D. and chemist, a subject of the Emperor of Germany, and a resident of Zernsdorf, near Konigswusterhausen, in the Empire of Germany, have invented certain new and useful Improvements in Methods of Rendering Wood, Paper, and Such Like Material Fireproof, of which the following is a specification.

It is known that ammonium sulfate is an excellent fireproofing medium for wood, paper, fabrics, and other substances. It is also known, however, that ammonium sulfate is readily soluble and is dissolved even by damp atmosphere alone. This bad quality restricts the use of this salt to such an extent that it must be excluded from the category of practicable available fireproofing mediums. As it goes into solution in damp atmosphere, it affects not only the impregnated wood, fabric, or the like, but accomplishes to the greatest extent destruction of everything that comes in contact with the impregnated substance, such as metallic mountings, clothing, &c. In order to obviate this objectionable property of ammonium sulfate—namely, its ready solubility—the same is, according to the present invention, used in chemical combination with a metallic sulfate, producing a metallic ammonium sulfate—such, for example, as magnesium ammonium sulfate,

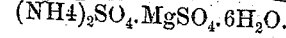

The several components must, according to the invention, be mixed in the exact proportions in which they occur in the above illustrative double sulfate. For the formation of this magnesium ammonium sulfate, by way of example, the following equation will serve as a basis:

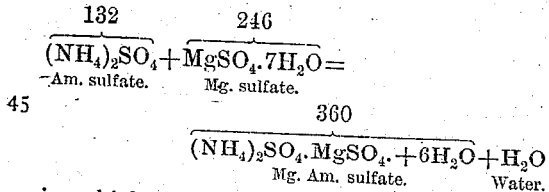

in which the numbers above the individual components designate their molecular weights. From this it follows that ammonium sulfate and magnesium sulfate produce the magnesium ammonium sulfate only in the proportion 132:246::1:1.86, and these proportions must be used in order to obtain a commercially practical impregnating mixture. A surplus of one of the two component parts would be unconditionally surplusage in so far as the undesirable properties of this substance had any effect, and this could only be neutralized in the form of ammonium metallic sulfate. If ammonium sulfate is provided in greater proportion than the ratio requires, just so far is the product made undesirable by the bad property of its ready solubility, which the double sulfate does not take up. If we have more of the magnesium sulfate, then this excess will have its effect to just that extent to which the increased proportion is provided. The presence of an excess of magnesium sulfate is to be restricted to a minimum, first, because its fireproofing capacity is, so to speak, "*nil*," and, second, because the combination, like all magnesium salts, has the property under high temperature of producing a strongly-incandescing oxid, which can in the event of a fire cause damage, owing to its remaining incandescent for a long time and spreading the fire by the dropping of the embers.

It is to be understood that I do not limit myself to the described magnesium ammonium sulfate, for obviously instead of magnesium sulfate in the formation of the double salt one of the sulfates of zinc, iron, cobalt, nickel, or copper may be employed and when used in like ratio will produce metallic ammonium sulfate equivalent to the double sulfate selected as an example. Therefore when I refer to "magnesium ammonium sulfate" in the claims I intend to include all the double sulfates that are chemical equivalents for the purpose intended. These several metallic sulfates would be used in the following proportions to one part of ammonium sulfate: magnsium sulfate, 1.86 parts; zinc sulfate, 2.18 parts; iron sulfate, 2.10 parts; cobalt sulfate, 2.13 parts; nickel sulfate, 2.13 parts; copper sulfate, 2.16 parts.

In impregnating wood especially boracic acid may be added to the double salt, or after the wood has been impregnated with the double salt it may be subsequently treated with boracic acid. Boracic acid forms under high temperature a tough vitreous flux over the fiber, thereby opposing the escape of any products of distillation which may be formed and imparts to the remaining carbon not only a great strength, but makes it also an excellent insulation against the flame of the fire.

If magnesium sulfate is used, the process is carried out as follows: For one cubic meter of impregnating fluid take one hundred and seventy kilograms of magnesium sulfate, 92.5 kilograms of ammonium sulfate, and fifty kilograms of boracic acid, which salts are dissolved in water, sufficient water being employed to give with the salts a cubic contents of one cubic meter; but if in the formation of the impregnating fluid the finished metallic ammonium sulfate—as, for example, magnesium-ammonium sulfate—is to be used immediately, then one takes from the latter for one cubic meter of impregnating fluid two hundred and fifty kilograms and fifty kilograms boracic acid. The wood is impregnated with the solution thus made. One can use for this purpose one of the known mechanical impregnating processes. For the better understanding there is here given an example of how one handles the wood with the impregnating fluid thus produced.

The impregnating fluid is warmed up to 60° to 98° centigrade and the wood is impregnated with the same. For this purpose one can introduce the wood into an air-tight closable vessel, which is evacuated, together with the wood, and after this has taken place the fluid, warmed to 60° to 70°, is next permitted to enter the vessel, is then warmed to about 98° centigrade, and is permitted to have its effect upon the wood for about three to twenty-four hours, during which time the temperature must remain even. The pressure in the vessel is now raised for a time up to six atmospheres, while the temperature is continually held to about 98° centigrade. After the expiration of this time the fluid is drawn off and the wood withdrawn from the vessel and dried.

Having thus described my invention, the following is what I claim as new therein, and desire to secure by Letters Patent:

1. The process of impregnating wood, paper, fabric, and the like, which consists in evacuating the pores of the material to be impregnated, applying to said material the herein-described solution of magnesium ammonium sulfate $(NH_4)_2SO_4.MgSO_4.6H_2O+H_2O.)$ at a temperature of about 60° centigrade, then raising the temperature of the said metallic-ammonium-sulfate solution to about the boiling temperature of water, permitting the metallic-ammonium-sulfate solution to affect the material for a suitable time, according to the quality of the material being treated, and finally forcing the metallic-ammonium-sulfate solution into the pores of the material under treatment, by heavy pressure.

2. The process of impregnating wood, paper, fabrics, and the like, which consists in heating a solution of magnesium ammonium sulfate to a temperature of about 60° centigrade, supplying it to the previously-evacuated material to be treated, raising the temperature of the magnesium-ammonium-sulfate solution to about the boiling temperature of water, continuing its application to the material from three to twenty-four hours according to the quality of the material being treated, and then subjecting the liquid, together with the wood, and at the same temperature, to a heavy pressure, producing a thorough penetration of the liquid into the material under treatment.

3. The process of impregnating wood, paper, fabrics, and the like, which consists in heating a solution of boracic acid and ammonium magnesium sulfate, to a temperature of about 60° centigrade, supplying said solution to the previously-evacuated material, then raising the solution to about boiling temperature of water, permitting the same to operate on the material to be treated from three to twenty-four hours, according to the quality of the said material, and then subjecting the solution, together with the material, while at the same temperature, to a heavy pressure, and producing a thorough penetration of the solution into the pores of the material under treatment.

In witness whereof I have hereunto set my hand in presence of two witnesses.

KARL RÜCKER.

Witnesses:
WOLDEMAR HAUPT,
HENRY HASPER.